United States Patent
Yeh et al.

(10) Patent No.: US 7,276,828 B2
(45) Date of Patent: Oct. 2, 2007

(54) MAGNETIC BEARING SYSTEM

(75) Inventors: Ting-Jen Yeh, Hsinchu County (TW); Kun-Fu Chuang, Hsinchu County (TW); Wen-Shi Huang, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 291 days.

(21) Appl. No.: 11/019,309

(22) Filed: Dec. 23, 2004

(65) Prior Publication Data

US 2005/0140228 A1 Jun. 30, 2005

(30) Foreign Application Priority Data

Dec. 25, 2003 (TW) .............................. 92136862 A (51) Int. Cl.
*H02K 7/09* (2006.01)
(52) U.S. Cl. .................................... 310/90.5; 310/67 R
(58) Field of Classification Search ............. 310/67 R, 310/90.5
See application file for complete search history.

(56) References Cited

U.S. PATENT DOCUMENTS 5,506,459 A * 4/1996 Ritts .......................... 310/90.5
6,784,581 B1 * 8/2004 Chen et al. ................. 310/90.5
2002/0117911 A1 * 8/2002 Fukutani .................... 310/67 R
2006/0091750 A1 * 5/2006 Wang et al. ................ 310/90.5
2006/0103249 A1 * 5/2006 Miya et al. ................. 310/90.5

FOREIGN PATENT DOCUMENTS

| CN | 1258339 | 6/2000 |
|----|---------|--------|
| CN | 2419413 | 2/2001 |
| JP | 4-339194 | 11/1992 |
| JP | 6-235420 | 8/1994 |
| JP | 08-177858 | 7/1996 |
| JP | 2000-161357 | 6/2000 |

* cited by examiner

*Primary Examiner*—Thanh Lam
(74) *Attorney, Agent, or Firm*—Birch, Stewart, Kolasch & Birch, LLP (57) ABSTRACT

A magnetic bearing system for a rotating machine is disclosed. The magnetic bearing system provides a non-contacting radial rigid support for the rotating machine by employing two magnetic assemblies each being formed by stacked annular magnets. The magnetic assemblies are mounted separately on a shaft of the rotating machine and a shaft hole provided on the stator seat of the rotating machine for containing the shaft.

10 Claims, 10 Drawing Sheets

MAGNETIC BEARING SYSTEM

BACKGROUND OF THE INVENTION (a) Field of the Invention

This invention relates to a bearing system for a rotating machine and, more specifically, to a magnetic bearing system.

(b) Description of the Related Art

Oil-retaining bearings and ball bearings, for today's rotating machines, are commonly used to provide a shaft with radial support and free rotation. However, the decrease of the oil quantity contained in an oil-retaining bearing due to long-term usage of the machine or poor sealing of the system can increase the friction force between the oil-retaining bearing and the shaft and results in accompanied high-temperature and noise. Therefore, oil-retaining bearings are becoming less capable of satisfying the requirements of high-performance rotation machines. On the other hand, ball bearings have a problem of wear variation for each rolling ball and thus cause unexpected vibration of the motor during operation and, in turn, produce big noise.

Figure 1:
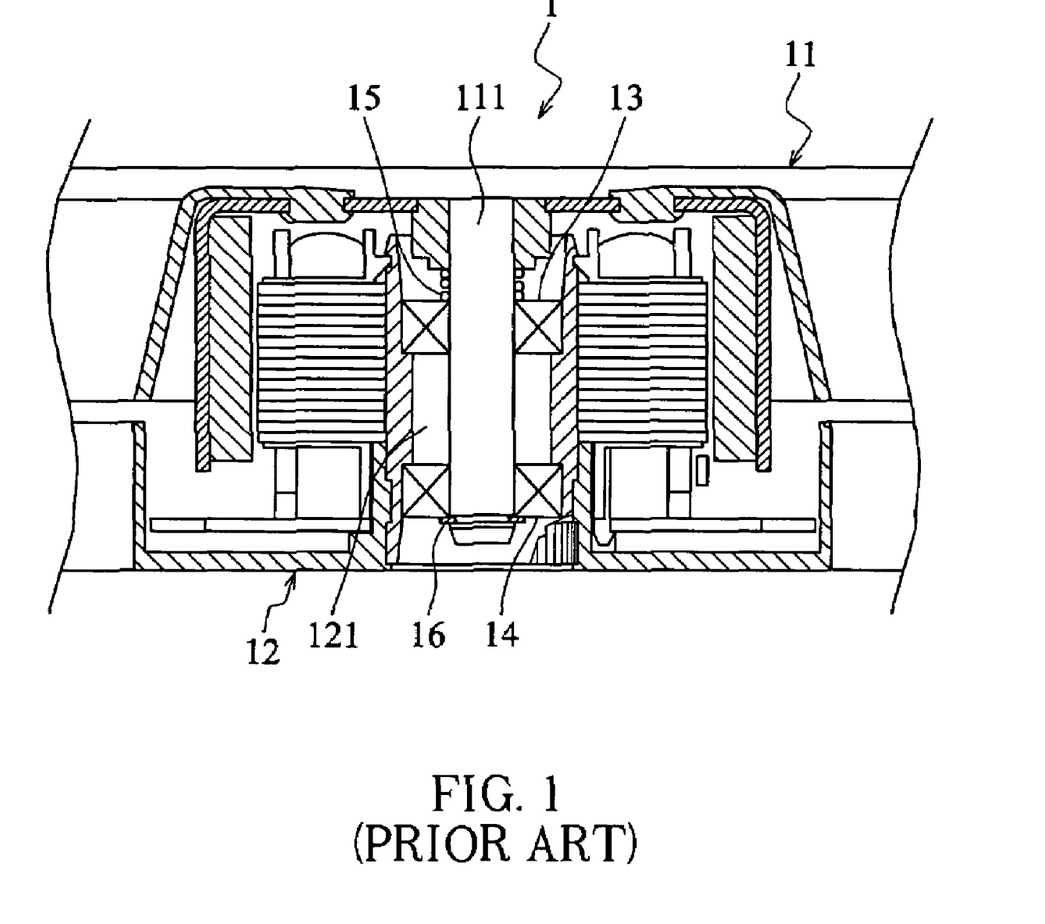
FIG. 1 is a sectional view of a conventional motor fan showing its bearing system.

FIG. 1 is a partially sectional view of a conventional fan motor 1, wherein a shaft 111 on a rotor 11 is contained inside a shaft hole 121 on a stator seat 12. As illustrated in FIG. 1, the fan motor 1 has two ball bearings 13 and 14 to constrain the shaft 111, preventing possible radial run out of the shaft 111 as well as providing radial support for the shaft 111. A spring 15 is also used to axially support the shaft 111 and a C retaining ring 16 is used to fix the shaft 111. However, the above-mentioned wear problem of the ball bearings 13 and 14 and the large radial contacting surface of the fan motor shaft 111 with the ball bearings 13 and 14, the spring 15 and the C retaining ring 16 can result in very loud noise and high temperature when the fan motor 1 is in operation. This in turn shortens the life of the fan motor 1.

The invention provides a magnetic bearing system for rotating machines. The magnetic bearing system gives axial and radial supports for rotating machines such as fan motors, lowers their friction and noise during operation, and thus prolongs the life of rotating machines.

BRIEF SUMMARY OF THE INVENTION

An object of the invention is to provide a magnetic bearing system for rotating machines. Magnetic assemblies are mounted separately on a rotor shaft and on a shaft hole of a stator seat for containing the shaft. Magnetic repulsion between the magnetic assemblies is utilized to provide the shaft with a non-contacting radial rigid support. This usage effectively reduces the friction, noise and vibration produced during an operation of a rotating machine, and thus increases rotating speed and prolongs the life of the rotating machine and its bearing system.

According to the invention, a magnetic bearing system comprises a shaft, a shaft hole for containing the shaft, a first magnetic assembly, a second magnetic assembly and a supporting assembly. The first magnetic assembly, which is mounted around a shaft, includes a plurality of annular permanent magnets, each of which has two opposite polarities on the ends; the annular permanent magnets are stacked with the same polarity ends of annular permanent magnets joint together. The second magnetic assembly, which is mounted on a shaft hole sidewall, includes a plurality of annular permanent magnets where the polarities of two ends of each annular permanent magnet are opposite; the annular permanent magnets are stacked and the joint ends of annular permanent magnets are of the same polarity. The supporting assembly is mounted on a stator seat for axially supporting the shaft.

In one aspect, the interface between opposite polarities of each annular permanent magnet of the first magnetic assembly is in alignment with the interface between opposite polarities of each annular permanent magnet of the second magnetic assembly.

In another aspect, the second magnetic assembly is axially shifted a distance with respect to the first magnetic assembly.

The invention is easily to assemble. Besides, it eliminates the radial large-area friction between a shaft and a bearing and the noise resulted thereof, and it also elongates the life of rotating machines and bearings.

Further scope of the applicability of the present invention will became apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
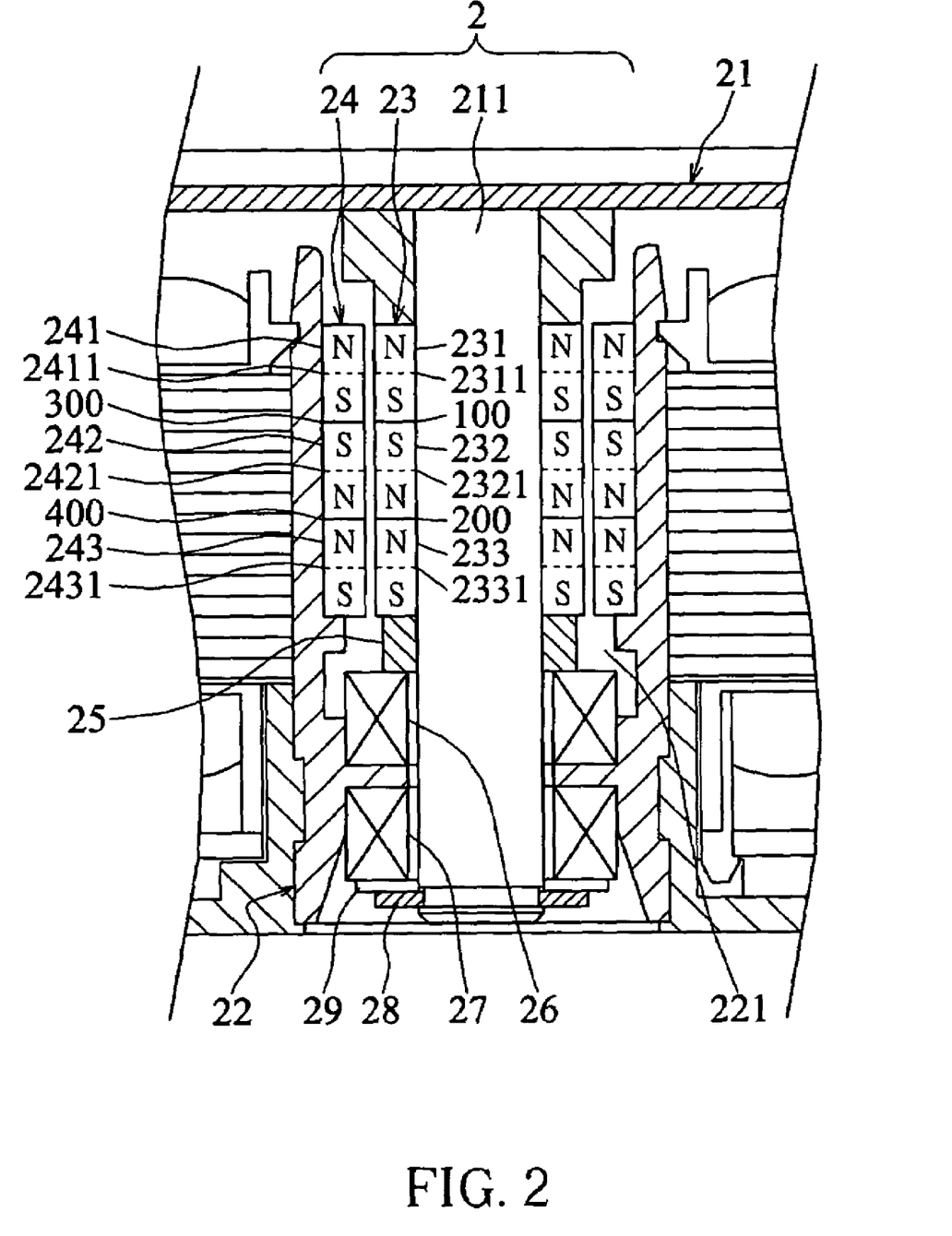
FIG. 2 is a sectional view of a fan motor embodying an embodiment of the first aspect of the invention.

Referring to FIG. 2, a magnetic bearing system 2 according to the first aspect of the invention is a stacked passive magnetic bearing system made of two magnetic assemblies 23 and 24 for providing radial support. Each of the magnetic assemblies 23 and 24 has more than one magnets stacked with the same-polarity ends jointed together, and the two assemblies are mounted separately on a shaft 211 and a stator seat 22 of the magnetic bearing system 2. The magnets can be annular conducting magnets or annular permanent magnets, and the annular permanent magnets are used to illustrate and describe the following embodiments of the invention.

The first magnetic assembly 23 is made of stacked annular permanent magnets 231, 232, and 233 with the same polarity of these magnets jointed together at joint faces 100 and 200 (North to North and South to South), and is mounted around the shaft 211 on a rotor 21 of a fan motor. The second magnetic assembly 24 is also made of stacked annular permanent magnets 241, 242, and 243 with the same polarity of these magnets jointed together at joint faces 300 and 400, and is mounted on a sidewall of a shaft hole 221 containing the shaft 211 on the stator seat 22. In addition, the magnetic assemblies 23 and 24 are positioned corresponding to each other and radially supporting the shaft; the two magnetic assemblies 23 and 24 are not in contact with each other.

In this embodiment, the stacked interfaces 2311, 2321 and 2331 between the opposite polarities of each annular permanent magnet 231, 232, and 233 and the stacked interfaces 2411, 2421, and 2431 between the opposite polarities of the corresponding annular permanent magnets 241, 242, and 243 are respectively in alignment, and the joint faces 100 and 200 between any two neighboring annular permanent magnets and the corresponding joint faces 300 and 400 are respectively in alignment, too. In other words, the north poles (or south poles) of the annular permanent magnets 231, 232, and 233 and the north poles (or south poles) of the corresponding annular permanent magnets 241, 242, and 243 are in a face-to-face relationship.

Also, the thickness of each of the annular permanent magnets 231, 232, and 233 of the first magnetic assembly 23 can be the same as illustrated in FIG. 2 or different from each other (not shown). For example, each annular permanent magnet of the magnetic assembly 24 has the same thickness as the corresponding annular permanent magnet of the magnetic assembly 23, that is, each pair of annular permanent magnets, such as annular permanent magnets 231 and 241, 232 and 242, and 233 and 243, have the same thickness. It is only required that the stacked interfaces 2411, 2421, and 2431 of the magnetic assembly 24 are aligned with the stacked interfaces 2311, 2321, and 2331 of the magnetic assembly 23.

Figure 4:
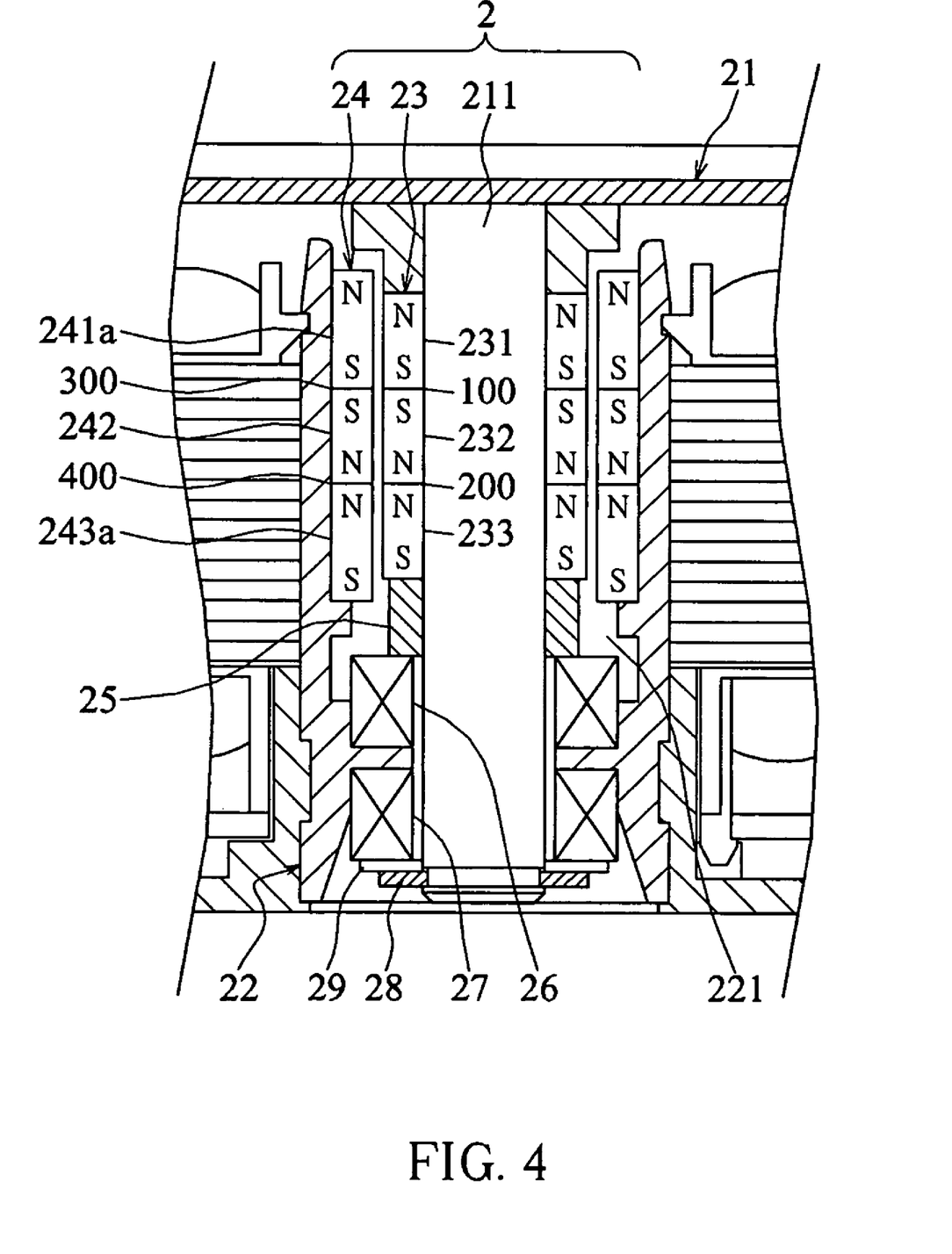
FIG. 4 is a sectional view of a fan motor embodying another embodiment of the first aspect of the invention.
Figure 5A:
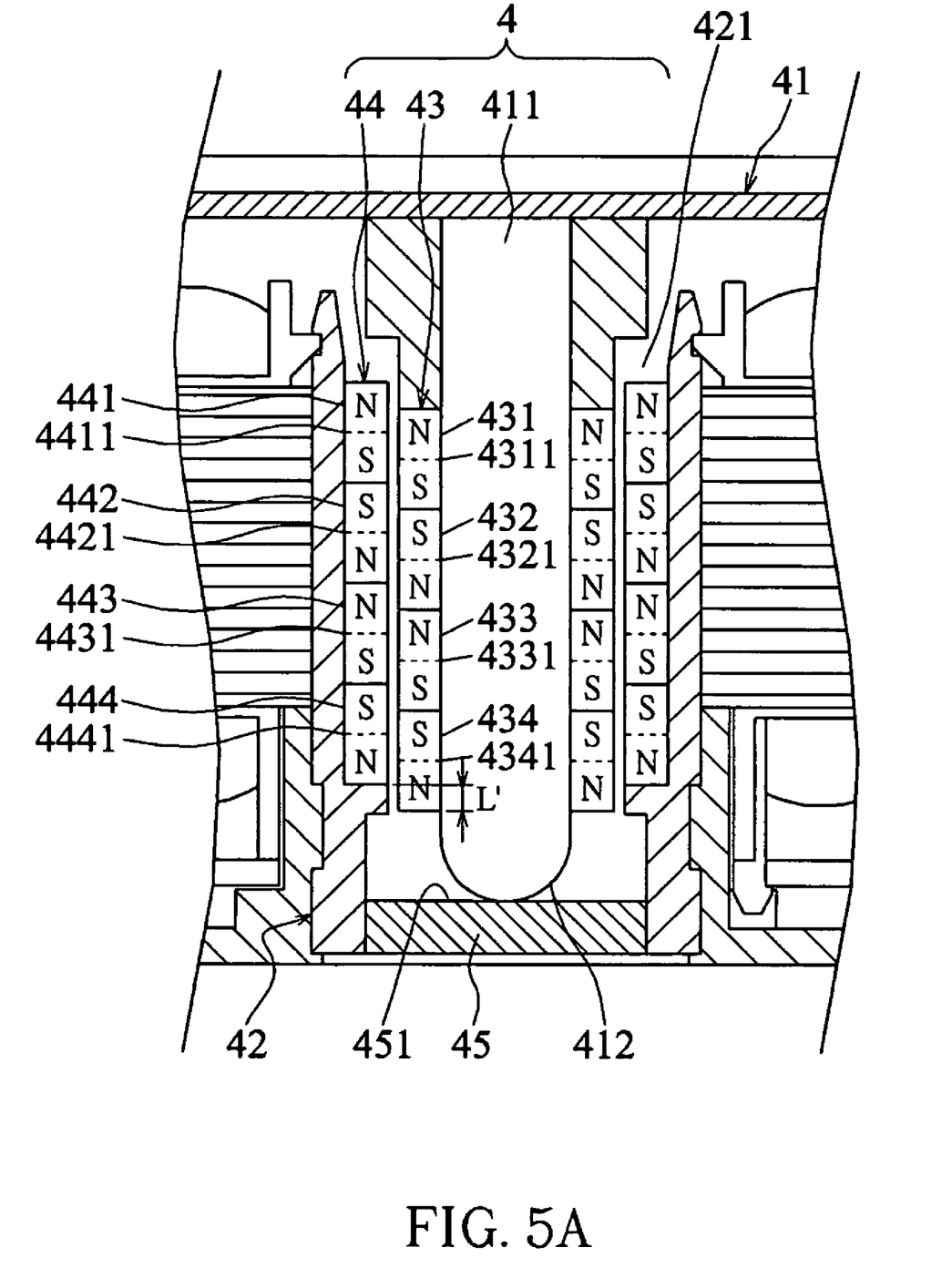
FIG. 5A is a sectional view of a fan motor embodying an embodiment of the third aspect of the invention.
Figure 5B:
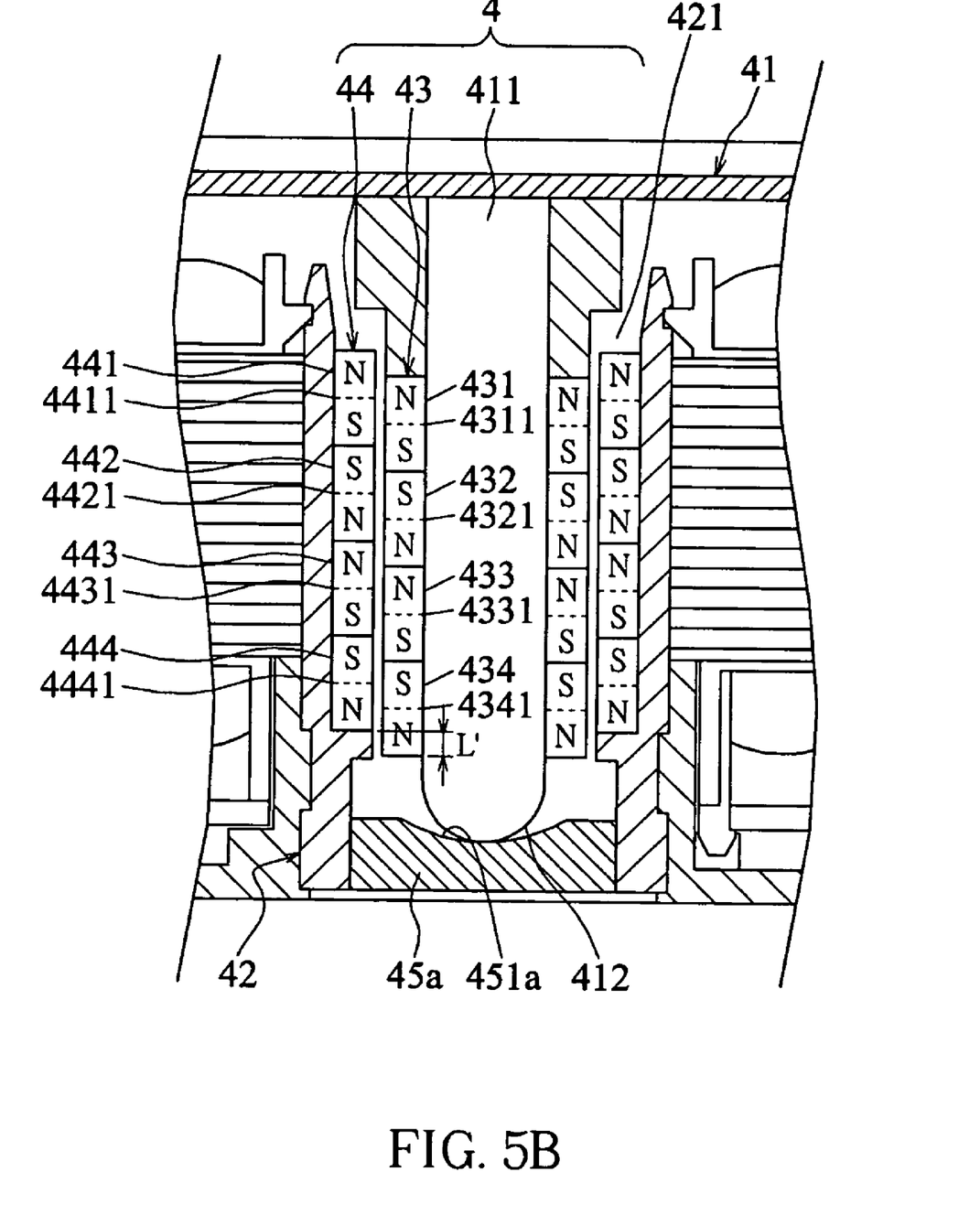
FIG. 5B is a sectional view of a fan motor embodying another embodiment of the third aspect of the invention.
Figure 5C:
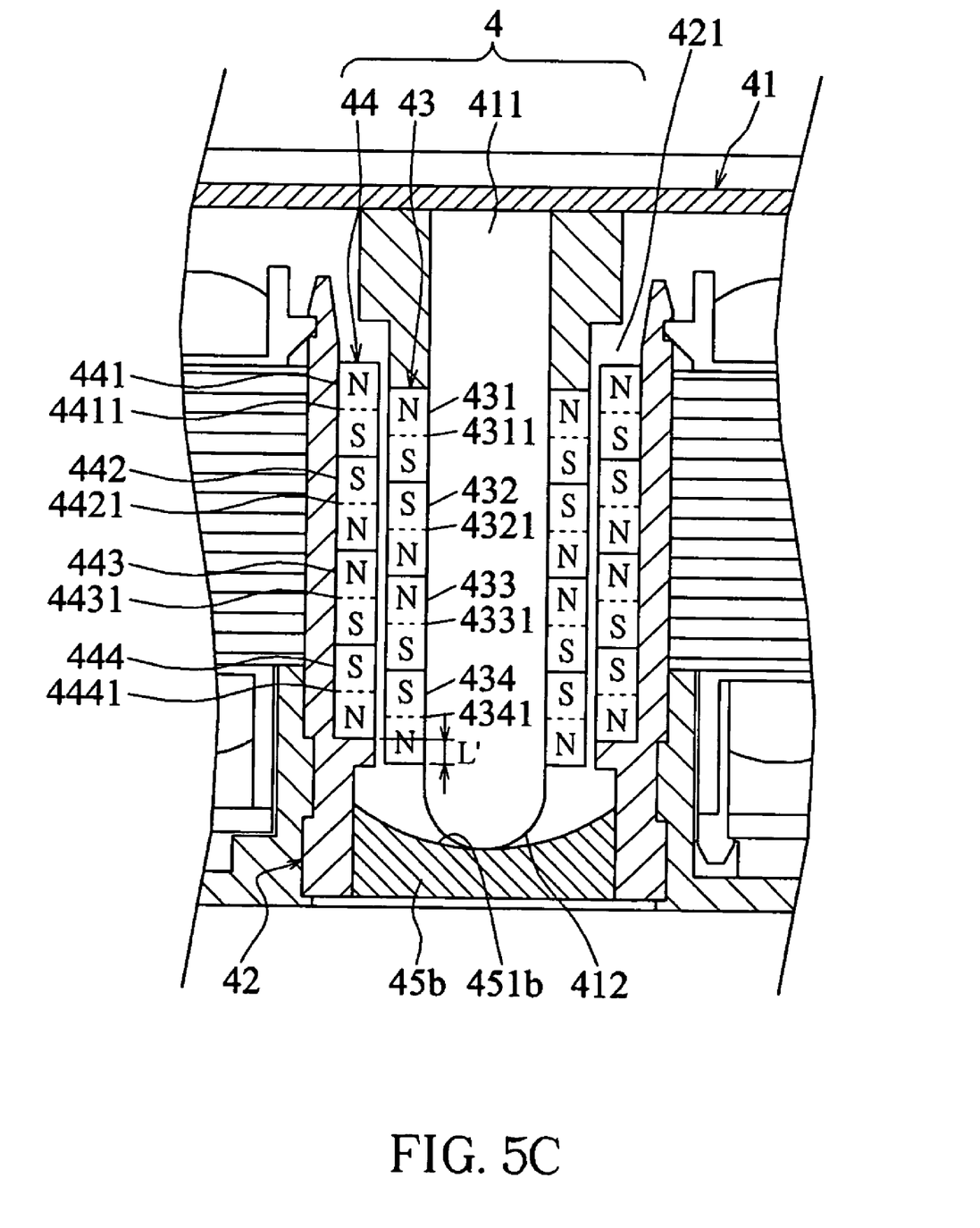
FIG. 5C is a sectional view of a fan motor embodying another embodiment of the third aspect of the invention.
Figure 5D:
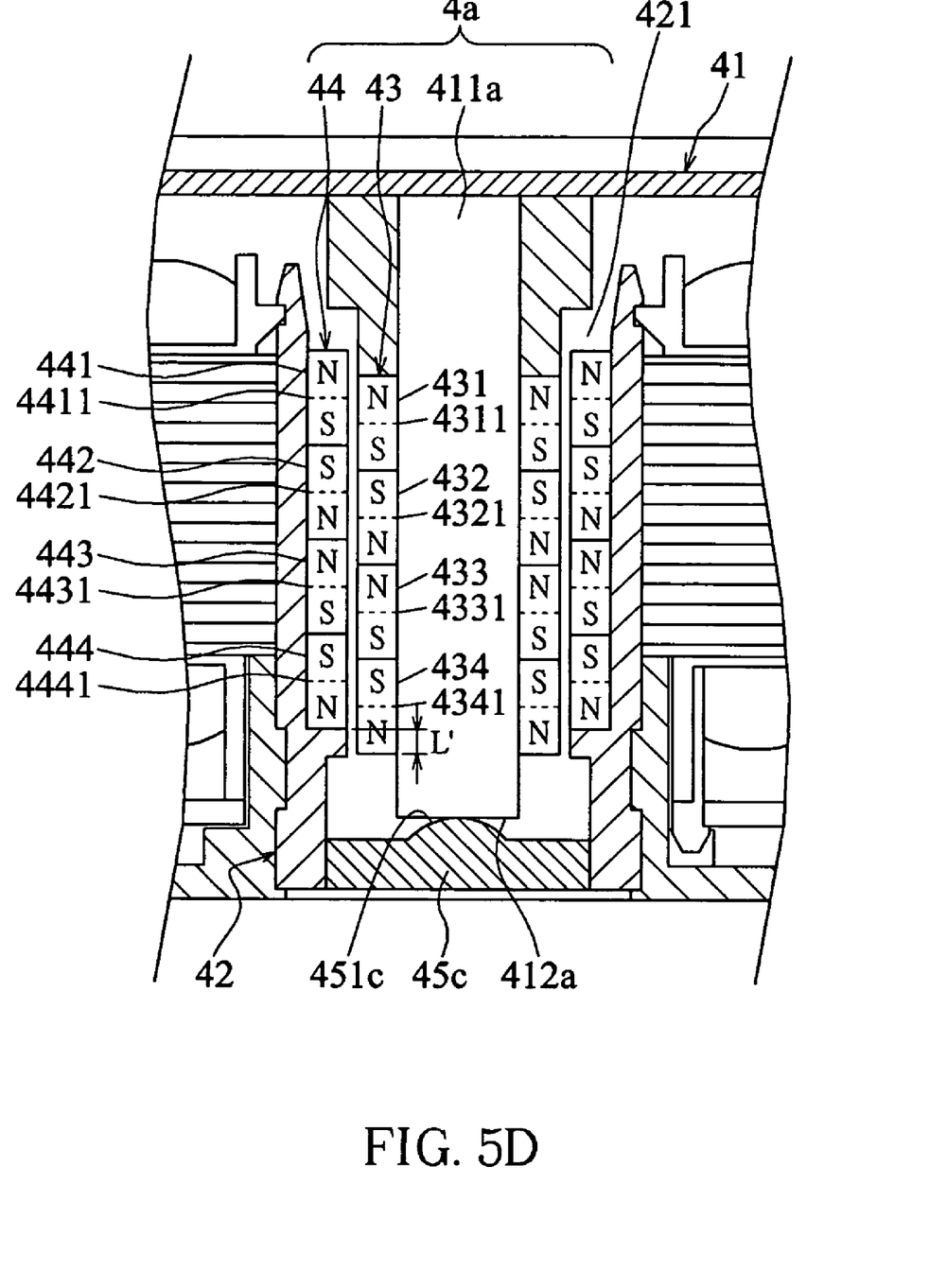
FIG. 5D is a sectional view of a fan motor embodying another embodiment of the third aspect of the invention.
Figure 5E:
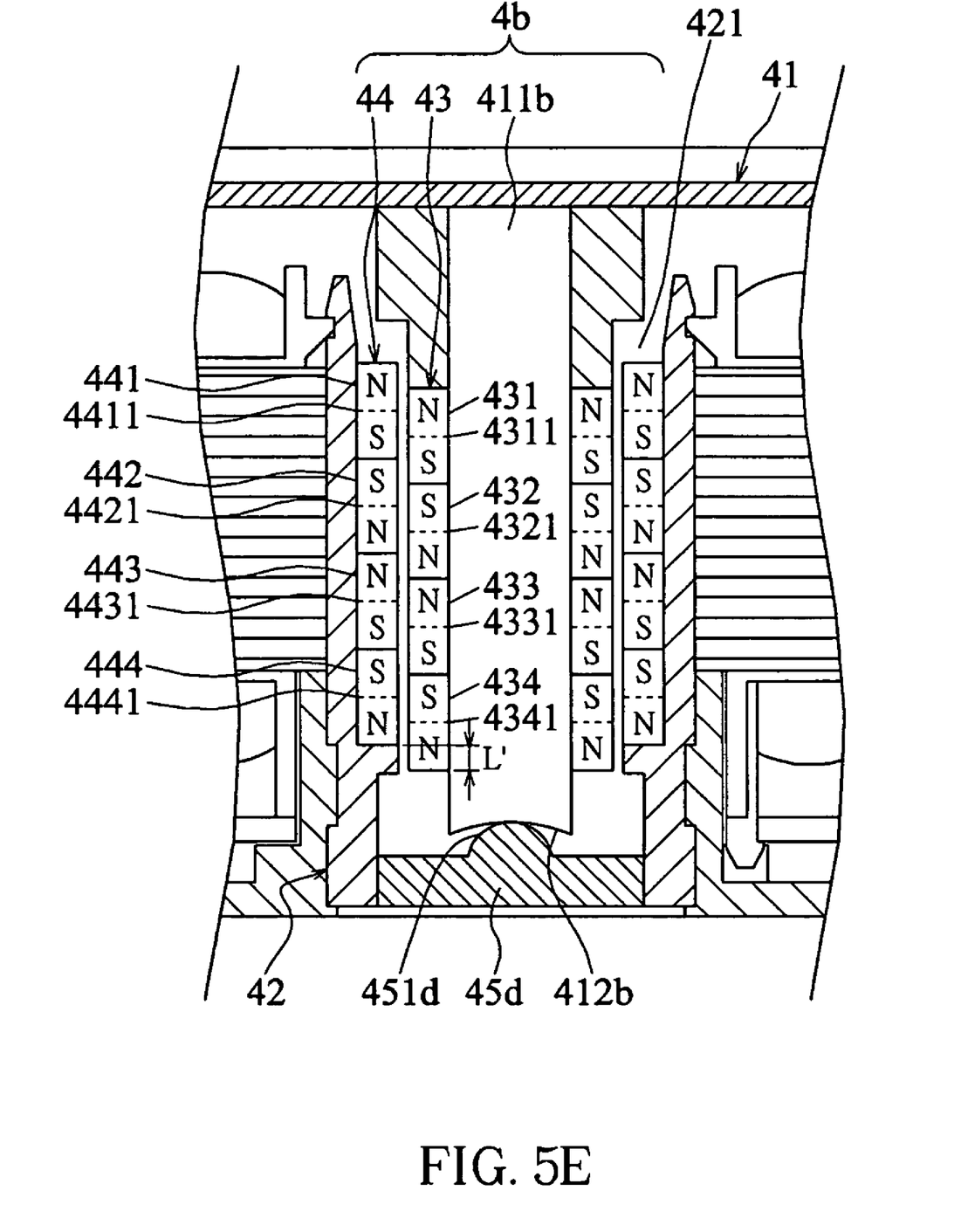
FIG. 5E is a sectional view of a fan motor embodying another embodiment of the third aspect of the invention.

Referring to FIG. 4, the thickness of two outer annular permanent magnets 241a and 243a of the magnetic assembly 24 mounted on the sidewall of the shaft hole 221 is larger than the thickness of corresponding annular permanent magnets 231 and 233 of the magnetic assembly 23 mounted around the shaft 211. This in turn lightens the load carried by an axial support element (like a thrust bearing as described later in the application), and compensates for the possible errors produced in magnet placements during manufacturing and assembling. The joint face of annular permanent magnets 100 and 200 and the joint face of the corresponding annular permanent magnets 300 and 400 are still aligned under this condition.

Therefore, according to the aspect shown in FIG. 2 and FIG. 4, it is only required that the stacked interface between the opposite polarities of each magnet of the magnetic assembly mounted around the shaft is aligned with the stacked interface between the opposite polarities of each corresponding magnet of the magnetic assembly mounted on the shaft hole sidewall, or that each joint face of annular permanent magnets is aligned with the joint face of the corresponding annular permanent magnets. In this case, the total thickness of the magnetic assembly mounted around the shaft and the total thickness of the magnetic assembly mounted on the shaft hole sidewall as well as the thickness of each annular permanent magnet can be the same or different.

Moreover, the magnetic bearing system 2 according to the first embodiment of the invention further comprises a bush 25, two deep groove thrust bearings 26 and 27, a C retaining ring 28, and a shim 29 to form an axial supporting assembly for the magnetic bearing system 2.

The deep groove thrust bearing 26 has its bottom surface sat on the stator seat 22 and its top surface be next to the bush 25; the bush 25 is mounted on the shaft 211 between the magnetic assembly 23 and the deep groove thrust bearing 26. The deep groove thrust bearing 26 in the magnetic bearing system 2 counteracts the axial movement of the shaft 211 towards the stator seat 22 by providing an axial force and supports the weight of the rotor 21, the shaft 211, the magnetic assembly 23 and the bush 25. The deep groove thrust bearing 27 is mounted on the stator seat 22 to counteract the movement of the shaft 211 away from the stator seat 22 in the magnetic bearing system 2 by providing an axial force. These deep groove thrust bearings 26 and 27 can be replaced by other bearings capable of thrusting, such as roller thrust bearings.

The C-retaining ring 28 is mounted on the shaft 211 to prevent the shaft 211 from moving up and down with respect to the shaft hole 221. The shim 29 is mounted on the shaft 211 between the deep groove thrust bearing 27 and the C-retaining ring 28 to equally distribute the loading. However, one can eliminate the use of the shim 29 when the C-retaining ring 28 used in an embodiment has a thickness sufficient to support the deep groove thrust bearing 27, and is able to distribute the loading equally.

In addition, the top and bottom surfaces of the bush 25 are adjacent to the magnetic assembly 23 and the deep groove thrust bearing 26, respectively. The purpose of the bush 25 is to block the magnetic attraction between the magnetic assembly 23 and the deep groove thrust bearing 26 as well as to support the magnetic assembly 23. Because of this, the bush 25 can be replaced by a support element that has suitable rigidity and is made of a material with low permeability, such as gold, nickel, silver, carbon, and lead, or impermeable materials.

Figure 6:
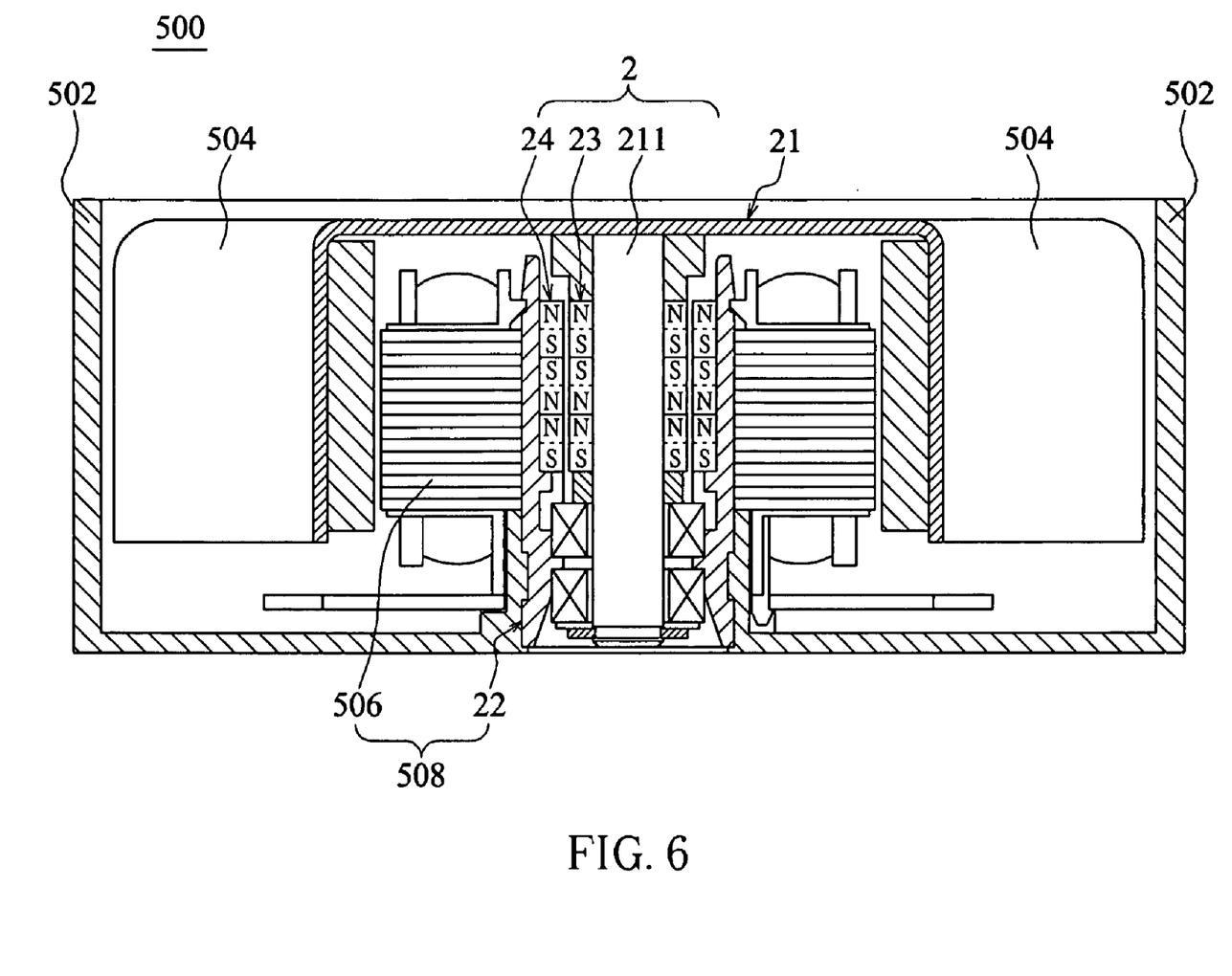
FIG. 6 is a sectional view of a fan embodying one embodiment of the invention.

As well, the magnetic bearing system 2 according to the invention can be incorporated in a fan 500 as shown in FIG. 6. The fan 500 comprises a rotor 21 and a stator 508. The rotor 21 comprises a shaft 211 and a plurality of blades 504 provided on the periphery of the rotor 21. The stator 508 comprises a stator seat 22 and a stator magnetic pole 506 provided on the periphery of the stator seat 22. The rotor 21 and the stator 508 are coupled via the magnetic bearing system 2 and can both be located in a frame 502. Now that the fan 500 utilizes the aforementioned magnetic bearing system 2, the fan 500 has reduced friction, noise and vibration during operation, increased rotating speed, and prolonged lifespan.

Figure 3:
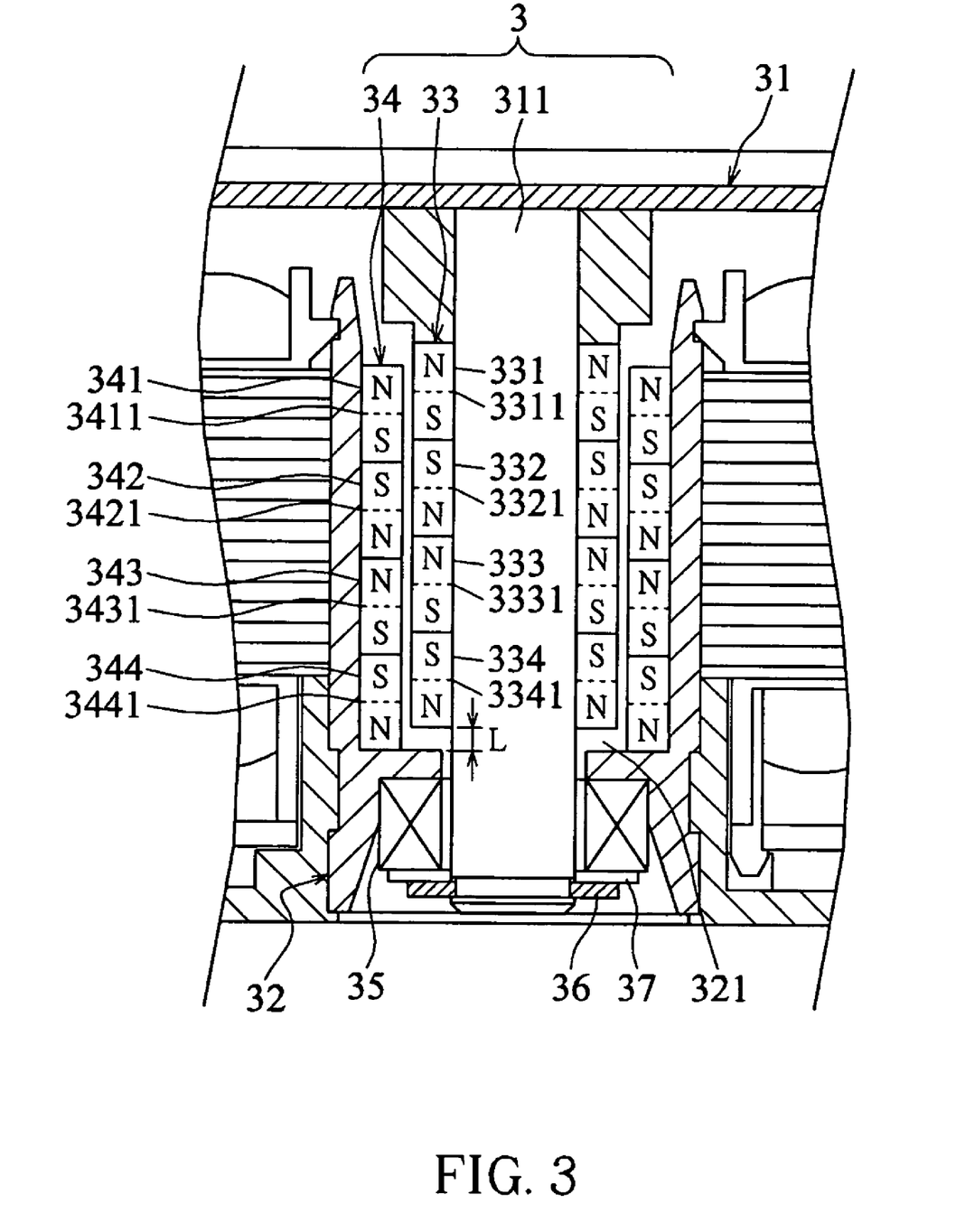
FIG. 3 is a sectional view of a fan motor embodying an embodiment of the second aspect of the invention.

Referring to FIG. 3, a schematic diagram of the magnetic bearing system 3 according to an embodiment of the second aspect of the invention is shown. This embodiment differs from the first embodiment in the arrangement of magnetic assemblies 33 and 34 and the axial support elements adopted. Description below explains only the differences between this embodiment and the embodiment of the first aspect and the similarities are not mentioned for simplification.

In this embodiment, the magnetic assembly 33 is upward axially shifted a distance L with respect to the magnetic assembly 34. That is, stacked interfaces 3311, 3321, 3331 and 3341 between the opposite polarities of each of the annular permanent magnets 331, 332, 333 and 334 of the magnetic assembly 33 mounted on a side wall of a shaft 311 are upward shifted a distance L with respect to stacked interfaces 3411, 3421, 3431 and 3441 between the opposite polarities of each of the annular permanent magnets 341, 342, 343 and 344 of the second magnetic assembly 34 mounted on a sidewall of a shaft hole 321, respectively. In other words, the stacked interfaces 3311, 3321, 3331 and 3341 are disaligned with the stacked interfaces 3411, 3421, 3431 and 3441. In this way, the magnetic force of magnetic assemblies 33 and 34 in the magnetic bearing system 3 provides an upward axial force to prevent the shaft 311 from moving towards a stator seat 32 (downward movement). Also, the magnetic force resists against the magnetic attraction between the magnetic assembly 33 and the deep groove thrust bearing 35, and supports the weight of the magnetic assembly 33.

Furthermore, the deep groove thrust bearing 35 is mounted on a stator seat 32 to counteract the axial movement of shaft 311 away from the stator seat 32 by providing an axial force. The deep groove thrust bearings 35 can be replaced by other bearings capable of thrusting, such as a rolling thrust bearing. Please note that the use of thrust bearings in this embodiment is concerned with the arrangement of the magnetic assemblies mounted around the shaft and on the shaft hole. In this embodiment, the magnetic assembly 33 is so upward shifted with respect to the magnetic assembly 34 that we have to adopt the thrust bearing 35, which has an axially-downward thrust direction, to prevent the upward axial movement of the shaft 311 while it rotates. Nonetheless, one can also have the magnetic assembly 34 upward shifted with respect to the magnetic assembly 33 to make the magnetic assembly 33 lower than the magnetic assembly 34. The magnetic repulsion between the two will contribute a downward axial force to prevent the upward movement of the rotating shaft 311. Moreover, a thrust bearing such as one with upward axial thrust direction may be used according to the magnetic repulsion effect between the magnetic assemblies 33 and 34.

As to FIG. 3, it is only required that there is an enough displacement in the same direction between the stacked interfaces of the magnetic assemblies 33 and the corresponding stacked interfaces of the magnetic assemblies 34. Once this requirement is reached, the thickness of each annular permanent magnet of the magnetic assemblies 33 and 34, or the total thickness of the magnetic assembly 33 and 34 can be the same, partially the same or totally different. Besides, each magnetic assembly 33 or 34 can be formed by at least one annular permanent magnet.

Referring to FIG. 5A to 5E, the schematic diagrams of the magnetic bearing systems 4, 4a and 4b according to the third aspect of the invention are shown. This aspect differs from the aforementioned aspects in that the magnetic assembly 44 is upward axial shifted with a distance L' with respect to the magnetic assembly 43, and one end of the shaft is formed with a convex 412, a flat 412a or a concave 412b that serves an acting surface. Furthermore, wear-resisting pads 45, 45a, 45b, 45c and 45d made of low friction materials are used in connecting with these acting surfaces of the end of shafts 411, 411a and 411b to support the shafts 411, 411a and 411b. Wherein the wear-resisting pads 45, 45a and 45b are used to support the shaft 411, while the wear-resisting pads 45c and 45d are used to support the shafts 411a and 411b, respectively.

The surfaces of the wear-resisting pads 45, 45a, 45b, 45c and 45d that touch these acting surfaces of shafts 411, 411a and 411b are each designed to be a flat face 451, curved surfaces 451a and 451b with curvatures smaller than that of the convex 412, a curved surface 451c with curvature larger than that of the flat 412a, or a curved surface 451d with curvature larger than that of the concave 412b. The function is to make the contacts between the shafts 411, 411a and 411b and the wear-resisting pads 45, 45a, 45b, 45c and 45d point contacts. Also, these acting surfaces including convex 412, concave 412b, curve surfaces 451a and 451b, curve surface 451c and curve surface 451d can be flat surface, rounded surface, concave surface, convex surface, arc surface, conical surface, paraboloid or ellipsoid.

Below is an explanation of the differences between this aspect and other aforementioned aspects, and the similarities between these aspects will not be further described.

In this aspect, the magnetic assembly 43 is formed by stacked annular permanent magnets 431, 432, 433 and 434 with the same polarity ends joint together, and the magnetic assembly 44 is formed by stacked annular permanent magnets 441, 442, 443 and 444 with the same polarity ends joint together. The annular permanent magnets 431, 432, 433, 434, 441, 442, 443, and 444 are magnets with two opposite polarities. The annular permanent magnets of the magnetic assembly 44 and the annular permanent magnets of the magnetic assembly 43 are corresponding to each other, respectively, and the magnetic assemblies 43 and 44 are not physically in contact with each other.

Specifically, the stacked interfaces 4411, 4421, 4431 and 4441 between the opposite polarities of each annular permanent magnets 441, 442, 443 and 444 of the magnetic assembly 44 mounted on a sidewall of a shaft hole 421 are upward shifted a distance L' with respect to the stacked interfaces 4311, 4321, 4331 and 4341 between the opposite polarities of the corresponding annular permanent magnets 431, 432, 433 and 434 of the magnetic assembly 43 mounted around the shaft 411. Thus, the magnetic force of the magnetic assemblies 43 and 44 counteracts the axial movement of shaft 411, 411a and 411b away from a stator seat 42 in the magnetic bearing system 4 by producing an axial force, and, as shown in FIG. 5A to 5E, this magnetic force provides a downward axial force to prevent the shafts 411, 411a and 411b from moving upward.

The wear-resisting pads 45, 45, 45b, 45c, and 45d are installed on the bottom of the shaft hole 421 on the stator seat 42 for carrying shafts 411, 411a and 411b to provide an axial force to counteract the movement of shafts 411, 411 and 411b towards the bottom of the stator seat 42, and to support the weight of a rotor 41, the shaft 411, 411a, 411b and the magnetic assembly 43. Through this method, one can further simplify the elements of the axially supporting assembly from aforementioned aspects including the deep groove thrust bearings, the retaining ring and the shim to a wear-resisting pad, and still provide sufficient axial support for the shafts 411, 411a, and 411b without worrying about the friction wear of the magnetic bearing systems 4, 4a, and 4b during the rotating process.

As to the aspect in FIG. 5A to 5E, it is only required that there is an enough displacement in the same direction between the stacked interfaces of the magnetic assemblies 43 and the stacked interfaces of the corresponding magnetic assemblies 44 for providing axial support for the shafts 411, 411a, and 411b. Once this requirement is reached, the total thickness of the magnetic assemblies 43 and 44 or the thickness of each annular permanent magnet can be the same, partially the same, or totally different. Also, each of the magnetic assemblies 43 and 44 can be formed by at least one annular permanent magnet.

In the aforementioned aspects, because the magnetic assemblies 23 and 24, or 33 and 34, or 43 and 44 are formed by at least one stacked annular permanent magnet, one can arrange suitable amount of annular permanent magnets to produce sufficient radial magnetic repulsion between the shaft 211, 311, 411, 411a, or 411b and the corresponding shaft hole 221, 321, or 421. This in turn prevents the large-area contact friction of the rotating shafts 211, 311, 411, 411a, or 411b and the corresponding shaft hole 221, 321, or 421, and balances the axial run-out risen when the shaft 211, 311, 411, 411a, or 411b rotates. Moreover, the invention uses the deep groove thrust bearing 26, 27 and 35 or the wear-resisting pad 45, 45a, 45b, 45c and 45d to provide an axial force to lower and even prevent the occurrence of axial vibration during rotating of the magnetic bearing systems 2, 3, 4, 4a, and 4b.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A magnetic bearing system adapted to be used in a fan, comprising:
    a first magnetic assembly mounted around an annular surface of a shaft of the fan, the first magnetic assembly having a plurality of separate magnets being stacked with the same polarity of adjacent magnets being jointed therein, wherein a stacked interface between two opposite polarities of each magnet of the first magnetic assembly is perpendicular to the annular surface of the shaft;
    a second magnetic assembly mounted on an annular surface of a stator seat of the fan, the second magnetic assembly having a plurality of separate magnets being stacked with the same polarity at adjacent magnets being jointed therein, wherein a stacked interface between two opposite polarities of each magnet of the second magnetic assembly is perpendicular to the annular surface of the stator seat; and
    a supporting assembly mounted on the stator seat for axially supporting the shaft; wherein the first magnetic assembly and the second magnetic assembly are positioned corresponding to each other and radially supporting the shaft.

2. The magnetic bearing system as described in claim 1, wherein the stacked interface of the first magnetic assembly is aligned or disaligned with the stacked interface of the second magnetic assembly.

3. The magnetic bearing system as described in claim 1, wherein one end of the shaft is formed with at least one acting surface, the supporting assembly comprises a wear-resisting pad, and a surface of the wear-resisting pad is in contact with the acting surface.

4. The magnetic bearing system as described in claim 3, wherein the acting surface is flat surface, rounded surface, concave surface, convex surface, arc surface, conical surface, paraboloid or ellipsoid.

5. The magnetic bearing system as described in claim 3, wherein the surface of the wear-resisting pad is flat surface, rounded surface, concave surface, convex surface, arc surface, conical surface, paraboloid or ellipsoid.

6. A fan, comprising:
    a rotor with a shaft and a plurality of blades;
    a first magnetic assembly mounted around an annular surface of the shaft, the first magnetic assembly having a plurality of separate magnets being stacked with the same polarity of adjacent magnets being jointed therein, wherein a stacked interface between two opposite polarities of each magnet of the first magnetic assembly is perpendicular to the annular surface of the shaft; and
    a second magnetic assembly mounted on an annular surface of a stator seat of the fan assembly, the second magnetic assembly having a plurality of separate magnets being stacked with the same polarity of adjacent magnets being jointed therein, wherein a stacked interface between two opposite polarities of each magnet of the second magnetic assembly is perpendicular to the annular surface of the stator seat;
    wherein the first magnetic assembly and the second magnetic assembly are positioned corresponding to each other and radially supporting the shaft.

7. The fan as described in claim 6, wherein the stacked interface of the first magnetic assembly is aligned or disaligned with the stacked interface of the second magnetic assembly.

8. The fan as described in claim 6, further comprising a supporting assembly mounted on the stator seat for axially supporting the shaft.

9. The fan as described in claim 6, wherein one end of the shaft is formed with at least one acting surface, the supporting assembly comprises a wear-resisting pad, and a surface of the wear-resisting pad is in contact with the acting surface.

10. The magnetic bearing system as described in claim 1, wherein each magnet of the first magnetic assembly has the same or different thickness as the corresponding magnet of the second magnetic assembly.

* * * * *